Dec. 31, 1963  B. F. SCHERER  3,116,078
COUPLING HAVING ANNULARLY ARRANGED U-SHAPED
GRIPPING MEMBERS RETAINED AGAINST
MOVEMENT IN SLEEVE
Filed July 18, 1961
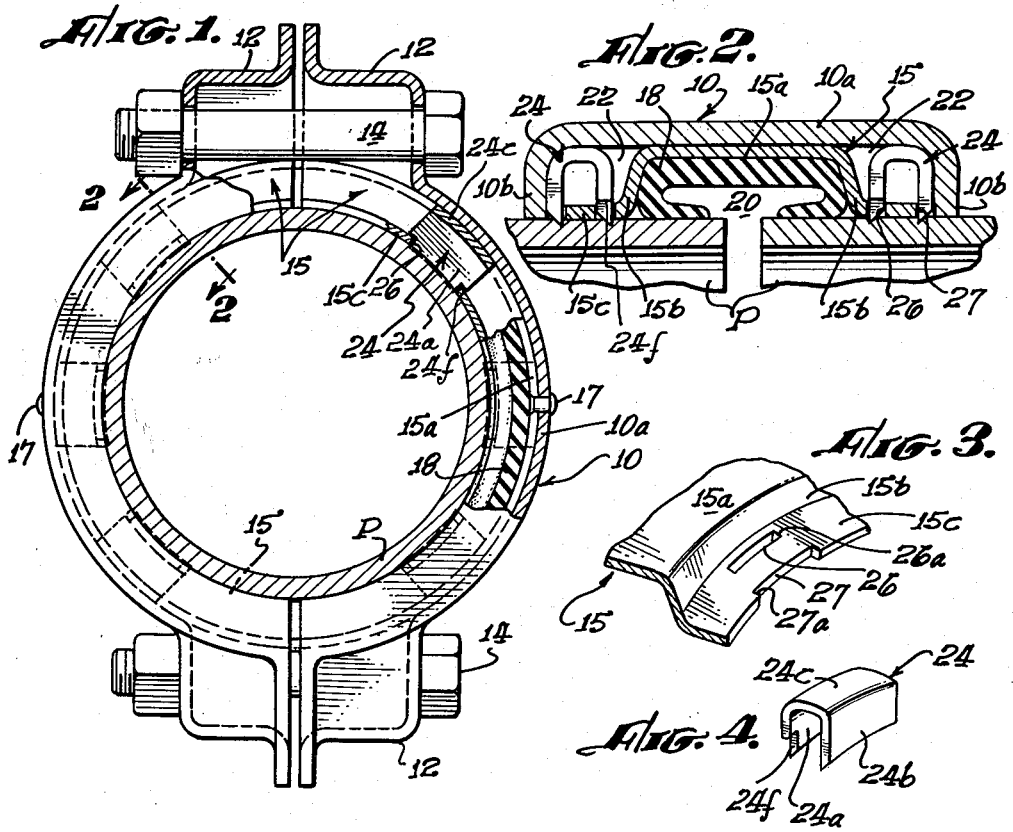
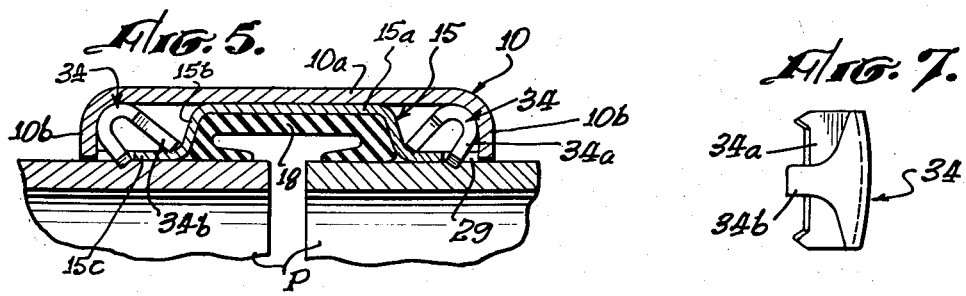
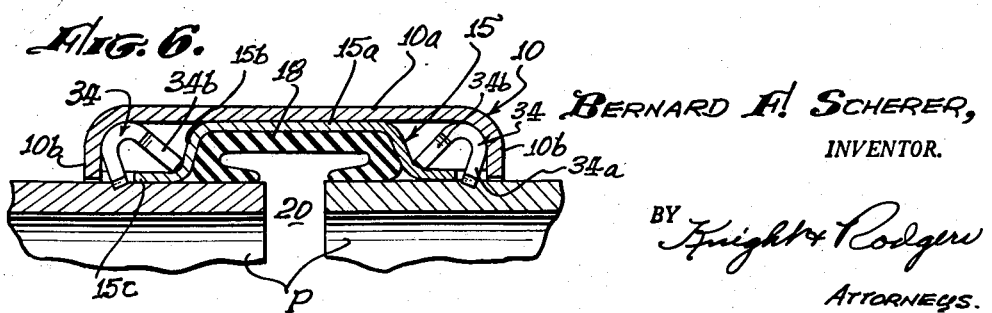
BERNARD F. SCHERER,
INVENTOR.
BY Knight & Rodgers
ATTORNEYS.

3,116,078
COUPLING HAVING ANNULARLY ARRANGED
U-SHAPED GRIPPING MEMBERS RETAINED
AGAINST MOVEMENT IN SLEEVE
Bernard F. Scherer, Van Nuys, Calif.
Filed July 18, 1961, Ser. No. 124,959
9 Claims. (Cl. 285—104)

The present invention relates generally to couplings for connecting together two lengths of a pipe or tube having a smooth exterior surface; and the invention is more especially concerned with a novel and advantageous design for a coupling of this character which requires no threads or other special conformation on the lengths of pipe to be connected.

A coupling is applied to the adjacent ends of two lengths of pipe and is clamped in place against the exterior surface of the pipe. The lengths of pipe have a smooth exterior surface, normally of uniform diameter, and are not provided with threads, grooves, bells or other means for connecting together the lengths of pipe. One function of the coupling is to provide a fluid tight seal with the two sections of pipe in order to prevent leakage at the joint. Another function is to hold the pipe lengths against becoming separated by relative axial movement; and consequently the coupling is especially designed to resist an axial load on the pipe.

Thus it is a general object of the invention to provide a pipe coupling of the character described which is particularly effective in resisting a force applied axially in a direction to separate the lengths of pipe and which tightens its hold on the pipe as the axial pull increases.

Another object of the invention is to provide a novel design for a coupling of this character which makes it possible to utilize effectively steel stampings in place of castings, thus enabling the use of relatively high strength material which results in a greater unit strength for a given weight of material in the coupling or a coupling of lighter weight for a given size and strength. Also, other advantages are achieved by the changes in design and manufacturing methods since less technologically advanced equipment is required for fabrication of the unit from steel stampings.

A further object of the invention is to provide a pipe coupling of the character described employing gripping elements which enable the coupling to become fully effective even though the two lengths of pipe connected together are not exactly coaxial with each other.

A still further object is to provide a pipe coupling of novel design which can be manufactured and shipped at minimum cost.

These objects of the invention are attained by providing a pipe coupling comprising a housing formed in a plurality of arcuate segments, typically the housing consists of two semicircular segments each of which is a single stamping. Bolts, or other suitable means, are provided for drawing the segments together externally around the pipe. Inside the housing is an inner shell which is likewise formed in a plurality of arcuate segments, each of which is a single stamping. The inner shell confines a resilient annular sealing gasket which engages the external surface of the two lengths of pipe to effect a fluid tight seal. Inside the housing is a plurality of gripping elements which at one side are in engagement with the exterior surface of the pipe and at the opposite side bear against the inside face of the housing to be pressed thereby into engagement with the pipe. While these elements might take various shapes, in a preferred form they have a general U-shape, thus providing two legs having teeth in engagement with the pipe surface and an intermediate section at the base of the U-shape which is in contact with the inner surface of the housing. Suitable means, preferably in the form of flanges on the shell, are provided to engage the gripping elements and hold the elements against circumferential movement relative to the housing.

In one form of the invention, the gripping elements are inclined with respect to the pipe in such a way that if the length of pipes are pulled apart, the gripping elements, being made of highly elastic material, deform in such a manner that the pressure of the housing causes the elements to engage more firmly the length of pipe. Such gripping elements permit a limited movement of the coupling and pipe. However, in the preferred form of the invention the legs of the gripping elements are engaged by the shell in a manner such that they are held against lateral movement caused by forces directed axially of the pipe.

This application is a continuation-in-part of my co-pending application Serial No. 737,947, filed May 26, 1958, for "Pipe Coupling," now abandoned.

How the above objects and advantages of the invention, as well as others not specifically referred to herein, are attained will be more readily understood by reference to the following description and to the annexed drawing, in which:

FIG. 1 is an end elevation of the coupling illustrating a preferred embodiment of the invention, with portions of the housing and shell broken away, the coupling being in position on a pipe.

FIG. 2 is a fragmentary transverse section on line 2—2 of FIG. 1.

FIG. 3 is a fragmentary perspective of a portion of the inner shell illustrating the slot and shoulder means thereon holding the gripping elements against both axial and circumferential movement.

FIG. 4 is a perspective of a gripping element.

FIG. 5 is a transverse section similar to FIG. 2 showing a modified form of the invention.

FIG. 6 is a view similar to FIG. 5 showing the action of the gripping elements therein after the lengths of pipe have been further separated.

FIG. 7 is a view of a gripping element used in the modified form of the invention illustrated in FIGS. 4 and 5.

Referring now to the drawing, there is shown in FIG. 1 a complete pipe coupling assembled around a pipe P that has a smooth, cylindrical exterior surface. It will be seen that the coupling is built in two segments or halves which are similar to each other in all essential respects. The pipe coupling is normally made of a minimum number of segments for reasons of economy; but it will be understood that the invention is not necessarily limited to making the coupling in two halves. For use with pipe of large diameter, a larger number of segments may be advantageous.

The outer housing 10 is made in a plurality of arcuate segments. In the embodiment herein shown, there are only two such segments. They are each substantially semi-circular in shape and are adapted to extend around approximately one-half of the circumference of the pipe P. When viewed in transverse cross-section as in FIG. 2 it will be seen that the housing has a circumferential wall section 10a which terminates at each of the opposite sides in an integral flange 10b which extends radially inward from the circumferential wall 10a toward the exterior surface of the pipe P. When viewed in section, each housing segment resembles a broad, flat U-shape. Since each segment of the outer housing is formed from a single sheet of steel, the housing is of substantially uniform wall thickness throughout.

At each end of each housing segment there is formed a bolting lug 12 which may be of any suitable size and shape. It is preferable that the bolting lug be integral with the housing segment, as is the case when it is formed during the stamping operation; but the lug may be a separate member fastened to the housing segment by welding or other suitable means. Two opposing lugs 12 at the adjoining ends of the two housing segments are adapted to receive a bolt 14 as shown in FIG. 1. The two bolts 14 provide the means for drawing the housing segments together around the exterior of the pipe to bring the coupling into engagement therewith.

Located inside housing 10 is an inner shell 15 which is likewise made in a plurality of arcuate segments. Normally the number of such segments is equal to the number of segments of housing 10. The associated segments of the shell and housing are preferably connected together in some manner merely to hold the parts of the coupling in assembled positions; and a single rivet that connects the two segments, as shown at 17, is adequate for this purpose although any other suitable mean smay be used.

Inner housing 15 has a centrally located circumferentially extending wall 15a which conforms to and engages the outer housing at section 10a. At each of two opposite sides wall section 15a is integral with an inwardly extending wall section 15b which extends radially inward toward the outer surface of the pipe. The two inwardly extending walls sections 15b are spaced apart axially of the pipe and define between them a recess which is adapted to receive and confine the sealing member 18 which is made of rubber or other suitable rubber-like materials which will effect fluid tight engagement with the outer surface of the pipe P. This sealing member or gasket is a continuous annular member that spans the gap between the ends of the lengths of pipe P; and is of C-shape in transverse cross-section, as seen in FIG. 2, with the ends of the sealing member bearing against the exterior surface of the pipe at both sides of the gap between the two lenghts of pipe. Thus the ends of the sealing member are pressed against the outside surface of the pipe by pressure of the fluid within cavity 20 of the sealing member. Fluid enters this cavity 20 within the sealing member from the pipe through any gap between the ends of the pipe lengths. The fluid pressure in the pipe line assists in effecting a fluid tight seal between the sealing member and the outer surface of each pipe length, which action is in addition to the pressure applied radially to the sealing means by the surrounding pipe coupling.

At the inner end adjacent the pipe, each radial wall section 15b of the shell is integral with a flange 15c. The two flanges 15c extend laterally from each side of the inner shell and are closely adjacent to or in contact with the exterior surface of the pipe. This proximity to the outer surface of the pipe not only provides the desired confinement of the elastic sealing member 18 but assists the cooperation of the shell with the gripping members as will become evident. Each segment of the shell is stamped from a single sheet of steel and is consequently of a substantially uniform wall thickness throughout.

It will be noted that the radial wall sections 15b of the shell are each spaced inwardly of the coupling from one of the radially extending wall sections 10b of the outer housing. There is thus formed an annular space at 22 immediately inside each of the radial wall sections 10b of the housing. In these annular spaces and in engagement with the housing is a plurality of gripping elements 24. One of these gripping elements is shown in perspective in FIG. 4 from which it will be seen that the element comprises a pair of generally parallel arms 24a and 24b which are interconnected by an intermediate base section 24c. When viewed in end elevation (or in section as in FIG. 2), each of the gripping elements has a U-shape. The free edge of each of the arms 24a and 24b is sharpened or serrated in any suitable manner that may be desired in order to enable the gripping elements to indent the surface of the pipe and thus secure a firm engagement with the pipe. As an example of this arrangement, each of the pipe engaging edges of the arms 24a and 24b is beveled at a substantial angle to form a pair of spaced, sharpened edges which are located on one side of the gripping element to engage the pipe. The other side of the gripping element, base section 24c, is engaged by the inner surface of the outer housing to press the gripping element into engagement with the pipe section. The outer face of base section 24c is curved longitudinally and/or transversely as may be required to conform to housing 10 and thereby bring into mutual contact suitably large areas on the housing and gripping element. The sharpened edges are longitudinally curved to conform to the exterior surface of pipe P to obtain a firmer grip on the pipe.

It is preferred but not necessary to provide means holding the gripping members 24 substantially fully inside the shell when the coupling is not in place on a pipe. Though other means are possible, it is convenient to notch at least one leg of each element 24 as shown at 24f. This notch provides a shoulder engageable with the inner face of flange 15c to hold the element fully within the coupling. The notched leg is preferably the inner leg of the two when the assembly is viewed as in FIG. 2, that is, leg 24a is inserted in slot 26. Slot 26 is accordingly shorter than notch 27 when legs 24a and 24b are shaped as illustrated. Of course each gripping element straddles a fixed portion of a flange 15c lying between the notch 27 and the adjacent slot 26. Even without notches 24f, the gripping element and the flange have mutually engaging surfaces that keep the gripping elements from falling entirely out of the assembly before the coupling segments are assembled around the pipe.

It is preferred for various reasons that the maximum width of the inner shell 15 substantially fill the space between housing flanges 10b so that the laterally extending flanges 15c on the inner shell have only a slight working clearance with the housing flanges. However, each of the gripping elements extends past a flange and into engagement with the pipe surface in order to perform its normal function. Accordingly, openings are cut in the shell flanges 15c. These are of two types. The first type is illustrated by slots 26 located near the base of the shell flanges and the other type includes notches 27 which are recessed into the lateral edges of the shell flanges. The ends of openings 26 and 27 form shoulders, as indicated at 26a and 27a, that are engageable with the ends of the gripping element 24 passing through these openings in the shell. In practice the gripping element may actually contact only the shoulder 26a or 27a, contact with both not being necessary. These shoulders provide means for engaging the gripping elements to hold them against circumferential movement relative to the shell and the housing.

It will be noted that the shell flanges 15c are in engagement with or in close proximity to the outer surface of the pipe sections and consequently they engage the arms of the gripping elements immediately adjacent the pipe. This arrangement is preferred in order to support laterally the arms of the gripping elements to best advantage. The sides of slots 26 engage the two sides of one of the arms, for example 24a, and hold the arm of the gripping element against laterally applied forces, that is forces having a component directed axially of the pipe. Since each notch 27 is open on one side, the long side of the notch can support only one side of the other leg of the gripping element, for example leg 24b. However the other side of leg 24b is supported by engagement with the inner surface of a housing flange 10b, as shown clearly in FIG. 2. Consequently both legs of the gripping elements are supported against laterally applied forces in both directions axially of the pipe.

Gripping elements 24 are preferably located in the coupling in pairs, with the members of each pair at diametrically opposite positions with respect to the pipe, as may be seen by reference to FIG. 1. In the form of the coupling illustrated, there are three such pairs in each segment of the coupling gripping each length of the pipe P. It is of course within the scope of the invention to use a larger or smaller number of gripping elements in each segment as may be desired; and the number of elements is normally increased with an increase in pipe diameter because of the greater circumference available to accommodate the gripping members.

It will be evident that various modifications in the present arrangement may be possible, one that is obvious being elemination of notches 27 by reducing the width of the flanges 15c. However, if the flanges are reduced only by the width of the notch 27, the inner face of the leg of the gripping elements is still supported laterally by the edge of the flange in the same manner as just described.

In order to obtain the best support for the gripping elements and the best application to them of the axial and radial forces involved, it is preferred that the outer faces of legs 24a and 24b be flat. It is also preferred that these two sections of the gripping elements be inter-connected by a section having an outer surface which is in part curved and engages and conforms to a complementary surface on the inside of the housing 10. These engaging surfaces on the gripping elements and the housing have portions at least that are curved in a transverse plane, that is a plane which is generally parallel to or contains the axis of pipe P. These outer surfaces on the gripping elements engage the inner surfaces on the housing 10 and adjust the gripping elements to the pipe surface as the bolts 14 are tightened in order to press the gripping elements into engagement with the pipe by forces applied to the gripping elements through the outer housing 10.

The gripping elements 24 are not rigidly connected to either the shell or the housing which is advantageous in allowing the gripping elements to move relative to the other members of the coupling in order to adjust themselves to any irregularities in the outer surface of the pipe P. However the engagement between the surfaces of the gripping elements and surfaces on the inner shell segment are such that the gripping elements are retained in place within annular spaces 22 after the coupling is assembled by riveting or otherwise attaching the shell to the housing and before the coupling segments are assembled around the pipe.

There is shown in FIGS. 5 and 6 a modified form of the invention in which the coupling is constructed as previously described except for the gripping elements and minor changes in the shell. The gripping elements are shown in FIGS. 5 and 7 where it will be seen that, as before, the individual elements have a U-shape. Each element comprises two arms 34a and 34b which are inter-connected by an intermediate wall section. Only one of the arms 34a is provided with teeth that engage and indent the surface of the pipe. This arm 34a is the outer one of the two arms of the gripping element when viewed as in FIG. 5. The other or inner arm 34b rests on top of and against the axially extending flange 15c of the shell at one side thereof. For this reason the slots 26 are omitted from the shell flange but the notches 29 are similar to notches 27 but are preferably recessed deeper into the shell flange in order that the arms of the gripping members may be inclined with respect to a plane normal to the pipe axis.

The two arms of the U-shape gripping elements 34 are more or less parallel to each other and are each inclined inwardly of and toward the adjacent end of the length of pipe that is engaged by the element. Since one arm 34a engages the exterior surface of pipe P while the other arm 34b rests against the flange 15c of shell 15, the force exerted on the gripping elements by the housing not only causes them to firmly engage the pipe but also presses the shell flanges firmly against the pipe at either side of the sealing member 18. The gripping elements 34 are preferably made of a highly elastic material, as for example, spring steel with a high tensile strength. As a consequence, the gripping elements can be deformed within comparatively wide limits without taking a permanent set and without breaking. Advantages taken of this characteristic in the manner shown in FIG. 6. If the two lengths of pipe were subjected to an axial pull which causes the gap between them to increase in size, the two arms 34a and 34b of each of the gripping elements are slightly spread apart. However, in so doing, the ends of the gripping elements in contact with the pipe swing downwardly toward a vertical position and force themselves deeper into the pipe, thus improving the grip upon the pipe. Being highly elastic, the gripping elements will return to their original shape when the axial stress on the pipe sections is removed.

An advantage of the present invention is that the design of the coupling permits most parts, especially the housing and shell segments, to be die stamped from sheets of high tensile strength steel, or other suitable metal. This not only lowers production cost in practice, but makes fabrication possible without requiring a foundry. The need for patterns, moulds, and castings, characteristic of most known couplings, is eliminated. Only basic raw material and tools in the form of sheet stock and dies need be shipped to the place of fabrication thus requiring less elaborate manufacturing facilities than heretofore. Since adequate strength can be provided with a lesser weight of metal than when castings are used, the final coupling is lighter for a given size. When the finished product is shipped, this results in savings in packing and transportation costs.

Steel stamplings have a high degree of resilience compared with castings as previously used for couplings. This characteristic of the material enables parts of the coupling to yield to some extent if necessary; and makes it possible to effect a satisfactory connection with two lengths of pipe that may be angularly displaced from a true co-axial position. Such misalignment of the pipe lengths can be compensated for within the coupling. The gripping elements push the shell flanges against the pipe surface regardless of the exact position of the pipe engaged, because the flanges on the shell can shift radially for some distance and still confine the sealing member and engage the pipe. The gripping elements can likewise shift their position to engage accurately with a length of pipe that is angularly misaligned. As a consequence, alignment of the pipe lengths does not need to be as accurate as with known designs of couplings in order to avoid defective connections.

When the housing and shell are connected together over a limited area only, as by the single rivet, the housing and shell are free to move relative to each other to a limited degree as they are tightened around the pipe. This freedom of movement combined with the elastic nature of the steel stampings is of advantage in conforming the coupling to the pipe.

From the foregoing it will be evident that various changes may be made in the exact shape and arrangement of the various elements of my novel pipe coupling without departing from the spirit and scope of my invention. Accordingly it is to be understood that the foregoing description is considered to be illustrative of rather than limitative upon the invention as defined by the appended claims.

I claim:

1. A coupling of the character described for pipe or the like comprising:

an outer housing formed in a plurality of arcuate segments each having a circumferentially extending wall terminating at opposite sides in an integral flange extending radially inward toward the pipe;

means for connecting adjoining ends of said housing segments to draw them together around the pipe;

an inner shell formed in a plurality of arcuate segments disposed inside said housing, said shell having a central wall section conforming to and engaging the circumferential wall of the housing and integral with a pair of spaced wall sections each spaced inwardly from one of said flanges on the housing and extending radially inward from said central wall section to define an annular recess between said spaced wall sections and an annular space between each said spaced wall section and the adjoining flange;

sealing means in said annular recess and confined thereby in continuous engagement with the exterior surface of the pipe around the periphery thereof;

and a plurality of gripping elements circumferentially spaced apart within each annular space between a housing flange and a radially extending wall section of the inner shell, each gripping element being of U-shape in a cross section taken in a plane parallel to the longitudinal extension of the pipe, the two legs of the U-shape being substantially parallel and engaging the pipe at the free ends of the legs and engaging the inside of the housing over the central portion of the U-shape to press the element against the pipe, said gripping elements each having a length greater than the radial distance from the pipe to the point of said engagement of said gripping element with the housing, said shell having integral shoulder means engaging the gripping elements to prevent circumferential movement of the gripping elements relative to the housing.

2. A coupling as defined in claim 1 in which each inner shell segment is connected to and is within a housing segment and each gripping element and the adjacent inner shell segment have mutually engageable surfaces that retain the gripping element in its annular space within the housing segment before the coupling segments are assembled around the pipe.

3. A coupling as defined in claim 1 wherein the two legs of each of the gripping elements are perpendicular to the axis of the pipe and one leg of each gripping element is in engagement with the inner surface of one of the radially inward extending housing flanges.

4. A coupling as defined in claim 1 including means carried by the shell engaging both legs of the gripping elements to support them laterally in at least one direction against forces having components directed axially of the pipe.

5. A coupling of the character described for pipe or the like, comprising:

an outer housing formed in a plurality of arcuate segments each having a circumferentially extending wall terminating at opposite sides in an integral flange extending radially inward;

means for connecting adjoining segments to draw them together around the pipe;

an inner shell formed in a plurality of arcuate segments disposed inside said housing, said shell having one wall conforming to and engaging the circumferential wall of the housing and a pair of spaced, inwardly extending walls defining a recess;

sealing means in said recess confined by said shell to engage the exterior of the pipe;

and a plurality of gripping elements inside the housing, each gripping element having two arms joined by a central portion having a convex surface engaging a concave surface on the housing to press one of said arms against the pipe and the other of said arms against the shell.

6. A coupling as in claim 5 in which the shell and housing are made of resilient steel and are interconnected over only a limited area permitting limited movement of the housing and shell relative to each other except near the area of interconnection.

7. A coupling as in claim 5 in which the inner shell has two axially extending flanges engageable with the pipe, said flanges providing shoulder means holding the gripping elements against circumferential movement.

8. A coupling for connecting together two lengths of pipe or the like having a smooth exterior surface and arranged with ends of the two lengths adjacent each other, comprising:

a housing formed in a plurality of arcuate segments;

means drawing the segments together around the pipe;

resilient sealing means disposed inside the housing to effect a fluid tight seal with the exterior surface of the pipe;

an inner shell formed in arcuate segments disposed inside the housing and confining the sealing means, the shell having flanges;

and a plurality of gripping elements in engagement with the exterior surface of the pipe, each gripping element having a convex outer surface curved in a plane containing the axis of the pipe in engagement with a concave inner surface on the housing also curved in said plane, to press the element against the pipe, said gripping elements also engaging flanges of the shell to press them toward the pipe; said shell also having shoulders engaging the gripping elements to hold them against circumferential movement.

9. A coupling as defined in claim 8 in which the gripping elements are U-shaped with two arms joined by a curved section providing said convex surface and are made of a highly elastic material whereby the arms may be spread without taking a permanent set.

References Cited in the file of this patent

UNITED STATES PATENTS

| | | |
|---|---|---|
| 1,930,194 | Dillon | Oct. 10, 1933 |
| 2,201,372 | Miller | May 21, 1940 |
| 2,459,251 | Stillwagon | Jan. 18, 1949 |
| 2,473,046 | Adams | June 14, 1949 |
| 2,474,431 | Lipman | June 28, 1949 |
| 2,491,004 | Graham | Dec. 13, 1949 |
| 2,778,662 | Smith | Jan. 22, 1957 |
| 2,829,910 | Miller | Apr. 8, 1958 |